United States Patent
Gandham et al.

(10) Patent No.: US 7,492,726 B2
(45) Date of Patent: Feb. 17, 2009

(54) METHOD AND APPARATUS FOR OPTIMIZING CONVERGECAST OPERATIONS IN A WIRELESS SENSOR NETWORK

(75) Inventors: Shashidhar Rao Gandham, Richardson, TX (US); Ying Zhang, Richardson, CA (US); Qingfeng Huang, San Jose, CA (US)

(73) Assignee: Palo Alto Research Center incorporated, Palo Alto, CA (US)

( * ) Notice: Subject to any disclaimer, the term of this patent is extended or adjusted under 35 U.S.C. 154(b) by 575 days.

(21) Appl. No.: 11/314,616

(22) Filed: Dec. 20, 2005

(65) Prior Publication Data

US 2007/0140149 A1    Jun. 21, 2007

(51) Int. Cl.
*H04L 12/28* (2006.01)
(52) U.S. Cl. .................................. 370/254; 370/432
(58) Field of Classification Search .................. 370/254, 370/255, 256, 347, 337, 432, 442, 390
See application file for complete search history.

(56) References Cited

U.S. PATENT DOCUMENTS

| 2003/0012216 A1* | 1/2003 | Novaes ....................... 370/432 |
| 2005/0169183 A1* | 8/2005 | Lakkakorpi et al. ......... 370/238 |
| 2007/0115828 A1* | 5/2007 | Ahuja et al. ................. 370/236 |

OTHER PUBLICATIONS

"On Tree-Based Convergecasring in Wireless Networks", V.Annamalia, S. K. S. Gupta, and L.Schwiebert, (C) 2003 IEEE.*

* cited by examiner

*Primary Examiner*—Chirag G Shah
*Assistant Examiner*—Minh-Trang Nguyen
(74) *Attorney, Agent, or Firm*—Park, Vaughan & Fleming LLP

(57) ABSTRACT

A system that optimizes packet transmissions during a convergecast operation in a convergecast network. During operation, the system receives a request to perform the convergecast operation in the convergecast network. In response to the request, the system constructs a convergecast-tree, which includes the base-station and the plurality of nodes, based on hop counts from the plurality of nodes to the base-station. Next, the system linearizes the convergecast-tree so that the convergecast-tree contains a plurality of linear branches. The system then schedules packet transmission for each of the linear branches and each node in each branch based on a set of predetermined criteria to obtain a scheduled order. Finally, the system performs packet transmissions in the convergecast-tree using the scheduled order. Note that performing the convergecast operation in this way substantially optimizes the convergecast operation by reducing a total number of timeslots required to complete the convergecast operation.

24 Claims, 7 Drawing Sheets

SCHEDULE TABLE 600
(INITIAL STATE)

| Branch | A | B | C | D |
|---|---|---|---|---|
| Pkts Left | 3 | 2 | 2 | 1 |
| Last Slot | 0 | 0 | 0 | 0 |

SCHEDULE TABLE 606

| Branch | A | B | C | D |
|---|---|---|---|---|
| Pkts Left | 2 | 2 | 2 | 1 |
| Last Slot | 1 | 0 | 0 | 0 |

SCHEDULE TABLE 608

| Branch | A | B | C | D |
|---|---|---|---|---|
| Pkts Left | 2 | 1 | 2 | 1 |
| Last Slot | 1 | 2 | 0 | 0 |

SCHEDULE TABLE 610

| Branch | A | B | C | D |
|---|---|---|---|---|
| Pkts Left | 2 | 1 | 1 | 1 |
| Last Slot | 1 | 2 | 3 | 0 |

SCHEDULE TABLE 612

| Branch | A | B | C | D |
|---|---|---|---|---|
| Pkts Left | 1 | 1 | 1 | 1 |
| Last Slot | 4 | 2 | 3 | 0 |

SCHEDULE TABLE 614

| Branch | A | B | C | D |
|---|---|---|---|---|
| Pkts Left | 1 | 0 | 1 | 1 |
| Last Slot | 4 | 5 | 3 | 0 |

SCHEDULE TABLE 616

| Branch | A | B | C | D |
|---|---|---|---|---|
| Pkts Left | 1 | 0 | 0 | 1 |
| Last Slot | 4 | 5 | 6 | 0 |

SCHEDULE TABLE 618

| Branch | A | B | C | D |
|---|---|---|---|---|
| Pkts Left | 0 | 0 | 0 | 1 |
| Last Slot | 7 | 5 | 6 | 0 |

SCHEDULE TABLE 620

| Branch | A | B | C | D |
|---|---|---|---|---|
| Pkts Left | 0 | 0 | 0 | 0 |
| Last Slot | 7 | 5 | 6 | 8 |

FIG. 6

METHOD AND APPARATUS FOR OPTIMIZING CONVERGECAST OPERATIONS IN A WIRELESS SENSOR NETWORK

GOVERNMENT LICENSE RIGHTS

This invention was made with United States Government support under Contract No. F33615-01-C-1904 awarded by the ARPA/Airforce. The United States Government has certain rights in the invention.

BACKGROUND

1. Field of the Invention

The present invention relates to wireless sensor networks. More specifically, the present invention relates to a method and an apparatus for optimizing convergecast operations in a wireless sensor network.

2. Related Art

A convergecast operation is a type of many-to-one communication operation in a wireless sensor network in which some or all nodes in the network send data to a base-station during a relatively short time period. Convergecast operations are desirable in applications requiring periodic global state snapshots, such as in node residual energy monitoring operations, or in event-driven computations, such as a sniper localization application. In these applications, all of the data packets generated in the network have to be transmitted to a base-station for record-keeping or for intensive computational-analysis.

Generally, a time bound on convergecast latency and a guarantee on packet delivery are desirable in mission critical applications, e.g., surveillance and security applications. Specifically, a minimum convergecast latency facilitates timely detection of events which occur. Furthermore, a known time bound on the convergecast latency can help the base-station to schedule convergecast requests and related computations more effectively. Additionally, a high data delivery rate is desirable during a convergecast operation to allow the system to generate a more accurate picture of the sensing field.

Unfortunately, existing convergecast scheduling techniques are primarily based on contention-based medium access control (MAC) protocols, such as carrier sense multiple access (CSMA). When these techniques are employed during a convergecast operation, data packet collisions at sensors nodes create a major challenge, and can cause serious data losses. Furthermore, using recovery methods such as retransmission to remedy these data losses inevitably increases convergecast latency and leads to more collisions in high data rate applications, in addition to consuming extra energy. A radially coordinated transmission delay has been proposed to decrease the probability of collisions. However, as a result of using CSMA at the MAC layer, the additional convergecast latency resulting from radial coordination is far from optimal.

Hence what is needed is a method and an apparatus for performing convergecast operations in a wireless sensor network without the above-described problems.

SUMMARY

One embodiment of the present invention provides a system that optimizes packet transmissions during a convergecast operation in a convergecast network. During operation, the system receives a request to perform the convergecast operation in the convergecast network. This convergecast network includes a base-station and a plurality of nodes, wherein during the convergecast operation the plurality of nodes communicate packets to the base-station. In response to the request, the system constructs a convergecast-tree, which includes the base-station and the plurality of nodes, based on hop counts from the plurality of nodes to the base-station. Next, the system linearizes the convergecast-tree so that the convergecast-tree contains a plurality of linear branches. The system then schedules packet transmission for each of the linear branches and each node in each branch based on a set of predetermined criteria to obtain a scheduled order. Finally, the system performs packet transmissions in the convergecast-tree using the scheduled order. Note that performing the convergecast operation in this way substantially optimizes the convergecast operation by reducing a total number of timeslots required to complete the convergecast operation.

In a variation of this embodiment, the system constructs a convergecast-tree by: (1) broadcasting a message from the base-station to all one-hop neighbors of the base-station; and (2) propagating the message to each node in the plurality of the nodes through broadcast forwarding with duplicate suppression, so that the resulting convergecast-tree is a shortest-hop-count tree.

In a variation of this embodiment, the system obtains a hop-count for each node in prior to scheduling the packet transmissions.

In a variation of this embodiment, the system obtains the convergecast schedule for each node by performing a traversal of the convergecast-tree from each node to the base-station.

In a variation of this embodiment, each node can be in one of the following states during each timeslot of the convergecast operation: (1) a receiving state, during which the node may receive a packet from a neighboring node; (2) a transmitting state, during which the node may transmit a packet to a neighboring node; and (3) an idle state, during which the node neither transmits nor receives a packet.

In a variation of this embodiment, the system linearizes the convergecast-tree by decomposing the convergecast-tree into a plurality of logically linear branches.

In a variation of this embodiment, the system schedules packet transmissions for the plurality of linear branches by iteratively: (1) selecting up to three linear branches from the plurality of linear branches; and (2) scheduling an order of packet transmission among the selected linear branches based on a set of predetermined criteria.

In a variation of this embodiment, the set of predetermined criteria can include the number of nodes in each linear branch, and an identifier for each linear branch.

In a variation of this embodiment, each node in the plurality of nodes computes its own scheduled order for the convergecast operation.

In a variation of this embodiment, the convergecast-tree can be decomposed into a set of one-hop-subtrees, wherein the root of each of the one-hop-subtrees is an one-hop neighbor of the base-station.

In a variation of this embodiment, the total number of timeslots required to complete the convergecast operation based on the scheduled order is at most $\max(3n_k-1, N)$, wherein $n_k$ is the number of nodes in the largest linear branch, and N is the number of nodes in the convergecast-tree.

In a variation of this embodiment, the convergecast network is a wireless network.

BRIEF DESCRIPTION OF THE FIGURES

FIG. 6 illustrates a convergecast operation in a multi-line network using a common schedule table in accordance with an embodiment of the present invention.

Table 1 presents pseudo-code for a node to perform a convergecast scheduling operation in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

System Model for Convergecast-network

Figure 1:
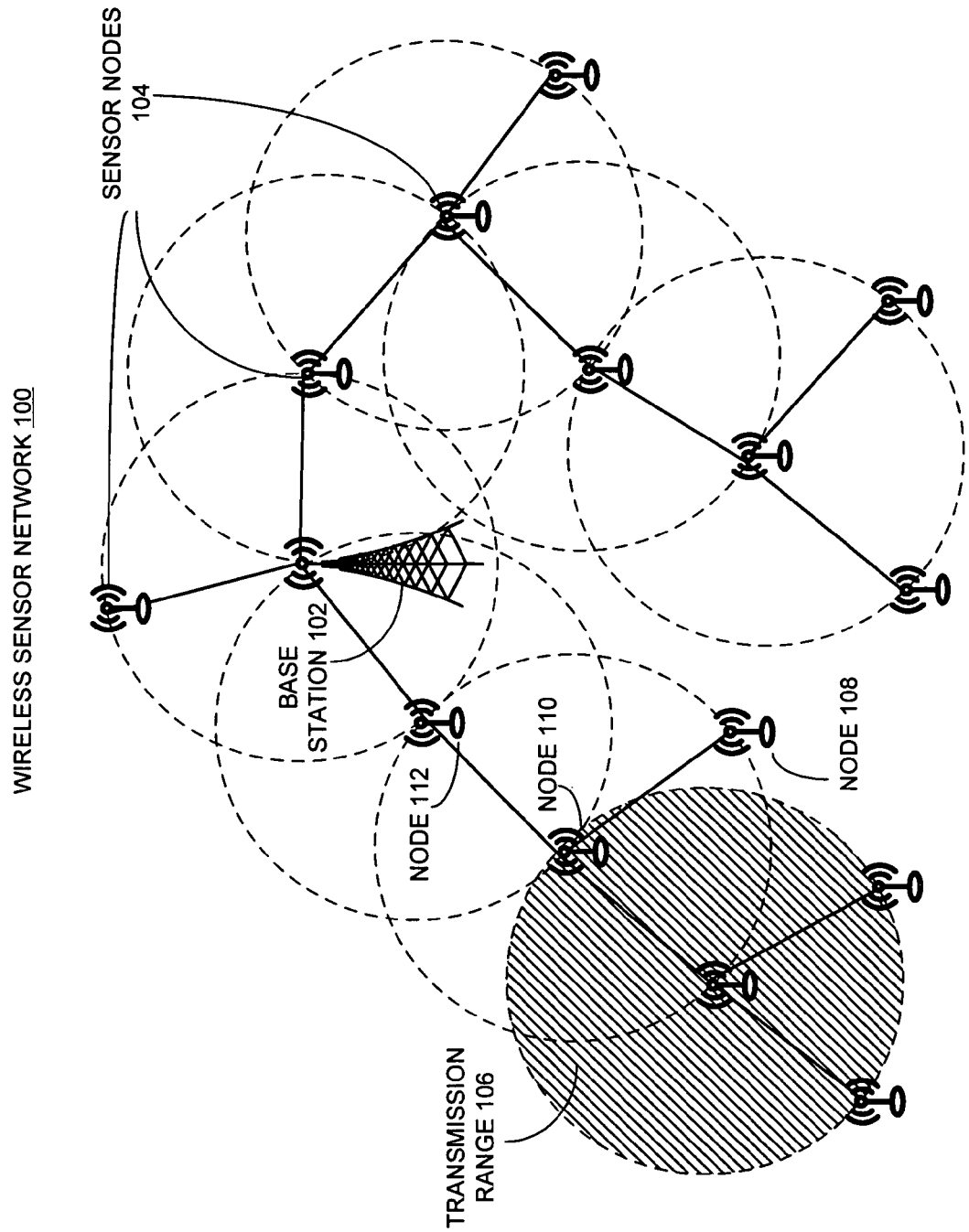
FIG. 1 illustrates a wireless sensor network in accordance with an embodiment of the present invention.

FIG. 1 illustrates a wireless sensor network 100 in accordance with an embodiment of the present invention. As illustrated in FIG. 1, wireless sensor network 100 includes a base-station 102 and a plurality of sensor nodes 104. During a typical convergecast operation, some or all the nodes 104 send data to base-station 102. Note that both base-station 102 and sensor nodes 104 are static.

Each of the sensor nodes 104 is equipped with an omni-directional transceiver. In one embodiment of the present invention, all of the communications are carried over a single frequency band. In this case, the nodes (including the base-station) cannot transmit and receive at the same time. Note that each transceiver in a node has a transmission range 106. Due to the limited range of the transceiver, most of the sensor nodes 104 cannot communicate with base-station 102 directly. Consequently, a distant node must communicate with base-station 102 by relaying data through a specific path. For example, node 108 can send data to base station 102 through the following chain of nodes 108→110→112→base-station 102. This process of relaying data between nodes is referred to as "hopping," and the number of hops is referred to as a "hop-count" for each node. Note that in general node 108 can use multiple paths to send data to base-station 102. However, there exists a "shortest" path with the least number of hops.

In one embodiment of the present invention, the bandwidth of every wireless link in the network is the same and the network connectivity is fixed over time. Additionally, the maximum length of a data packet is fixed.

In one embodiment of the present invention, the time domain is sliced into "timeslots," which are similar to timeslots in time division multiple access (TDMA) protocols. The duration of a timeslot is sufficient long to allow transmission of one data packet. We consider applications wherein a base-station receives every data packet sent by the nodes without aggregation of the packets at intermediate nodes. Note that during "packet aggregation" a set of packets are assembled into one packet before transmission.

One of the goals of the present invention is to minimize the total number of timeslots required to complete the convergecast operation.

Scheduling Convergecast in a Linear Network

Figure 2:
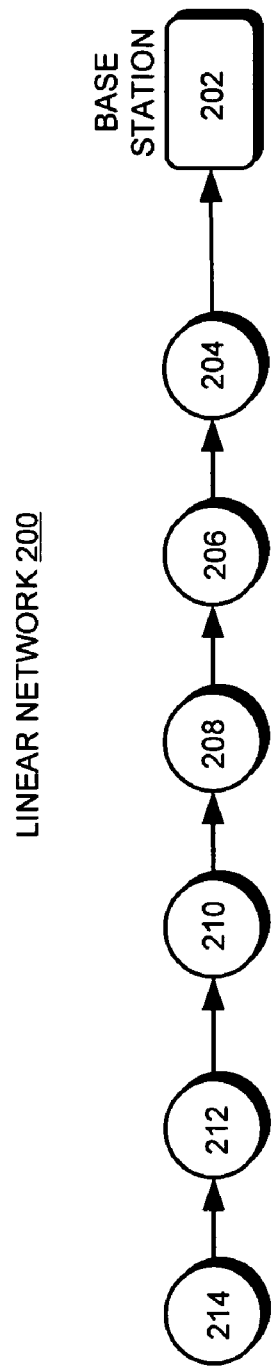
FIG. 2 illustrates a typical linear network in accordance with an embodiment of the present invention.

A linear network has the simplest structure for scheduling a convergecast operation. For example, FIG. 2 illustrates a typical linear network in accordance with an embodiment of the present invention. During a convergecast operation, all nodes in linear network 200 transmit a data packet to base-station 202 on the right, which is represented by right-pointing arrows between the nodes. More specifically, a node in network 200 can be in one of the following three states during any given timeslot:

TRANSMIT (T) 300: The node may transmit a packet to a neighboring node.

IDLE (I) 302: The node neither transmits nor receives, i.e. idle state.

RECEIVE (R) 304: The node may receive a packet from a neighboring node.

In linear network 200, the hop-count of a node is conveniently determined by the distance of the node to base-station 202. For example, nodes 204 to nodes 214 have hop-counts from 1 to 6 respectively. In the following discussion, we can conveniently refer nodes based on their hop-counts to the base-station, i.e., one-hop nodes or one-hop neighbors, two-hop nodes or two-hop neighbors, and so on.

In one embodiment of the present invention, each node in linear network 200 is initialized with one of the three above-described states based on the associated hop-counts to base-station 202. Specifically, a node with hop-count n is assigned to one of the following states: (i) TRANSMIT 300 if n mod 3 is 1; (ii) IDLE 302 if n mod 3 is 2; and (iii) RECEIVE 304 if n mod 3 is 0, wherein mod is the "modulo" operator.

Figure 3:
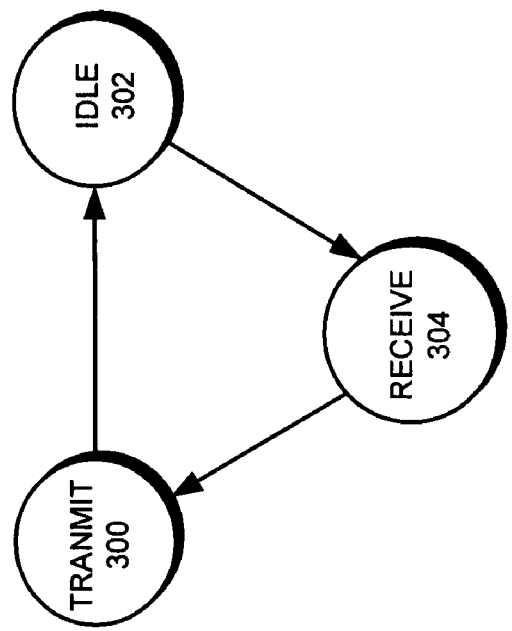
FIG. 3 illustrates a state-transition diagram for a node during a convergecast operation in accordance with an embodiment of the present invention.

During a convergecast operation, a node moves from one state to another during subsequent timeslots in accordance with a state transition diagram shown in FIG. 3. For example, node 204 has an initial state of TRANSMIT 300, i.e., node 204 transmits in the first timeslot. Upon completing the transmission, node 204 moves to the next state IDLE 302 in the next timeslot, i.e., node 204 remains idle in the second timeslot. Next, in the third timeslot node 204 moves into state RECEIVE 304, i.e., node 204 receives a packet from node 206 in the third timeslot. Node 204 returns to its initial state after every three timeslots, thereby resulting in a "three-timeslot cycle." Similarly, node 206 has an initial state IDLE 302, i.e., node 206 is idle in the first timeslot. Next, node 206 moves to the next state RECEIVE 304 in the second timeslot, i.e., node 206 receives from node 208 in the second timeslot. In the third timeslot, node 206 moves into state TRANSMIT 300, i.e., node 206 transmits a packet to node 204 in the third timeslot. Node 206 also returns to its initial state after every three timeslots.

All nodes continue to transition from one state to the next based on the state transition diagram until the convergecast operation completes.

Note that for every node in state R there is only one node in its neighborhood which is in state T. As a result, all the packet transmissions scheduled in accordance to this convention will not interfere with each other and will hence be successful.

Also note that, the order of the state transition diagram is not limited to T→I→R→T, and may be modified in particular convergecast operations, for example, in reverse order T→R→I→T, if necessary.

Note that the lower bound on the number of timeslots required to complete convergecast in linear networks is 3N−3, where N is the number of nodes in the network. Also note that the above-described convergecast scheduling technique requires 3N−2 timeslots to complete a convergecast operation in linear networks, where N is the number of nodes in the network.

Moreover, note that this convergecast scheduling technique requires each node to buffer at most two packets in any given timeslot. This is desirable because the sensor nodes typically have limited amount of memory.

Scheduling Convergecast in a Multi-lined Network

Figure 4:
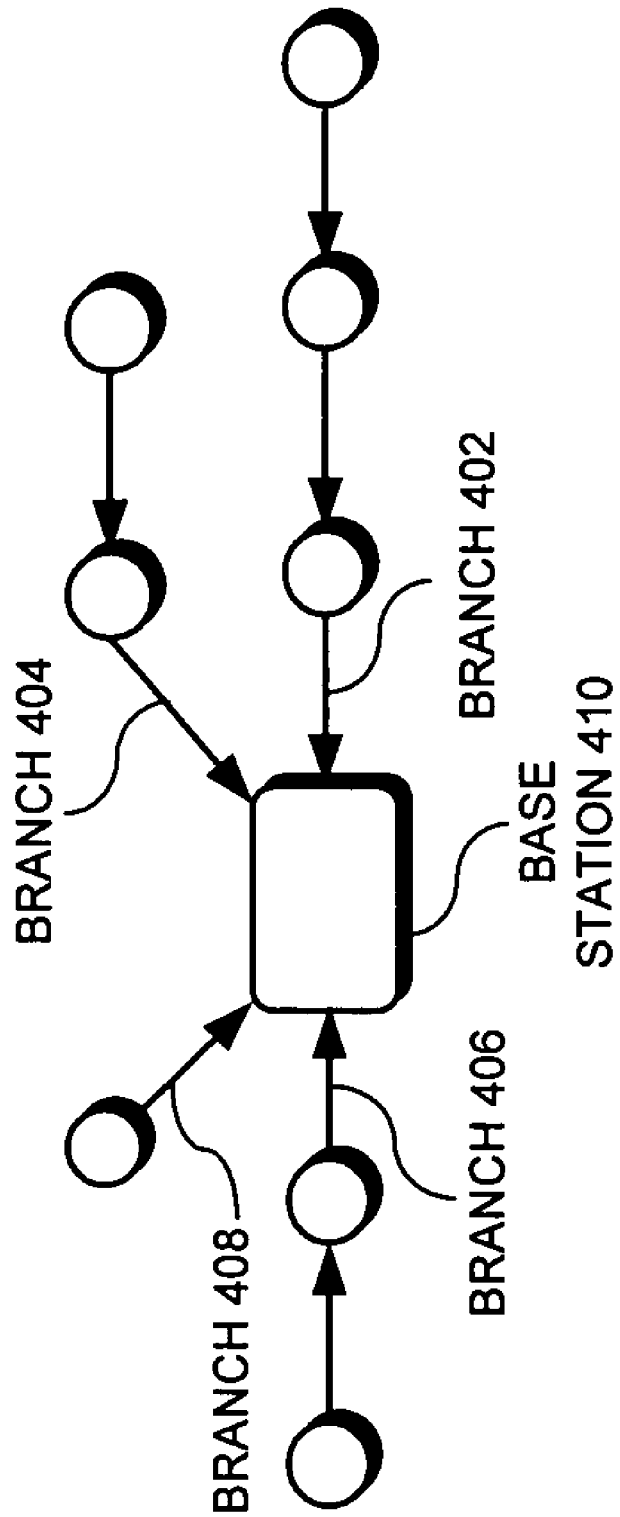
FIG. 4 illustrates a multi-line network 400 in accordance with an embodiment of the present invention.

FIG. 4 illustrates a multi-line network 400 in accordance with an embodiment of the present invention. Multi-line network 400 comprises four linear networks 402, 404, 406 and 408, which are referred to as "branches", and a base-station 410.

In a linear network, the base station receives exactly one packet every three timeslots. However, in the multi-lined network 400 shown in FIG. 4, one or more packets can be received by base-station 410 in every three-timeslot cycle. The higher throughput in the convergecast scheduling for multi-line networks is achieved by scheduling transmissions in parallel between multiple branches.

A distributed scheduling technique for convergecast operations in multi-line networks is described below. Note that the convergecast operation typically includes two phases: an initialization phase and a scheduling phase.

Figure 5:
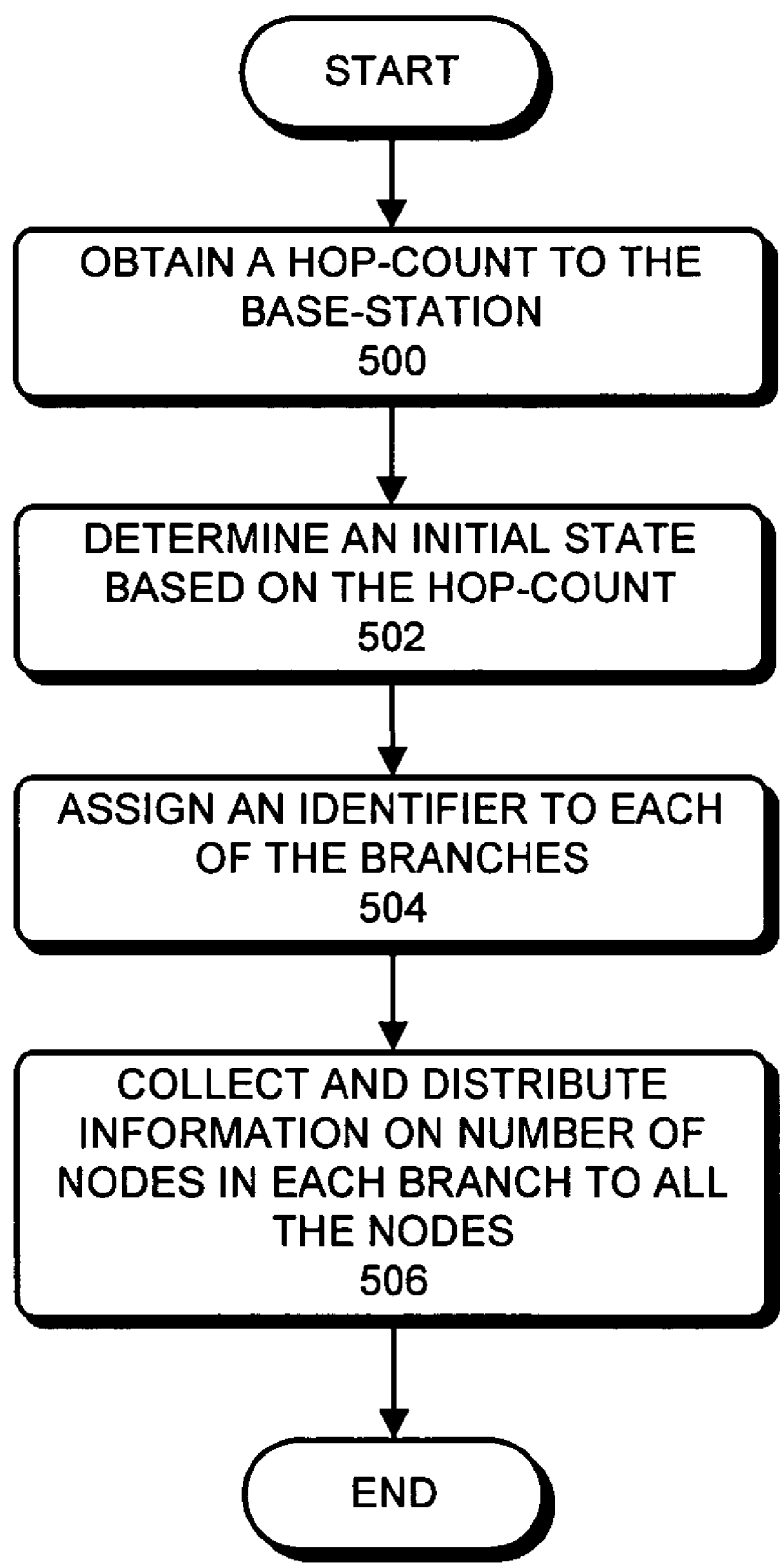
FIG. 5 presents a flowchart illustrating an initialization phase of a convergecast operation in a multi-line network in accordance with an embodiment of the present invention.

FIG. 5 presents a flowchart illustrating the initialization phase of a convergecast operation in multi-line network 400 in accordance with an embodiment of the present invention.

During this scheduling phase, each node begins by obtaining its hop-count to base-station 410 (step 500) and additionally determines its initial state based on the associated hop-count as described previously for the linear network (step 502). Next, during the initialization phase, base-station 410 assigns a unique identifier (ID) to each branch (step 504). Base-station 410 additionally collects and distributes information about the number of nodes in each branch to all of the nodes (step 506).

Upon completing the initialization phase, each node in multi-line network 400 is aware of its initial state (T, I, or R), its branch ID, and the number of nodes in all the branches of the network. Note that by using this information, all nodes in the network can then compute their corresponding schedule independently. This type of convergecast scheduling technique wherein each node computes its own schedule is referred to as a "distributed scheduling."

As mentioned previously, because each node (including the base-station) is equipped with a single transceiver, at most one packet can be received by any node (or the base-station) in a given timeslot. Because every node knows the number of packets in each branch, they can independently determine which branch forwards a packet during any given timeslot and can act accordingly.

Note that all the nodes in a branch which are scheduled to transmit to the base-station are considered to be "active" during a three-timeslot cycle beginning with a timeslot of transmission. This means that all the nodes in that branch change their states in accordance with the state transition diagram (see FIG. 3) in the three successive timeslots. Because the one-hop node along each branch is initially in state T, the base-station can receive a packet from that branch in a given timeslot t. Note that the first node in the branch will have zero packets until the end of three-timeslot cycle. As a result, no more packets can be received from that branch in timeslots t+1 and t+2. Hence, the branch is "eligible" to forward the next packet to the base-station only after timeslot t+2.

In a given timeslot, there may be more than one eligible branch ready to transmit a packet. In one embodiment of the present invention, the eligible branch with the highest number of packets remaining to transmit to the base station is given a priority to forward a packet to the base-station. In the event of a tie, a branch with the lowest ID can be given priority.

For example in FIG. 4, all the nodes that belong to branch 402 are active in timeslots 1, 2 and 3, which allows branch 402 to forward in the first timeslot. In the second timeslot branches 404, 406 and 408 are eligible to forward. Because branches 404 and 406 have more packets than 408 and branch 404 has fewer packets than 406, branch 404 forwards a packet in the second timeslot.

In one embodiment of the present invention, each node in the network maintains a common schedule table for the entire network during the convergecast operation. FIG. 6 illustrates a convergecast operation in multi-line network 400 using a common schedule table in accordance with an embodiment of the present invention. In FIG. 6, branches 402-408 are represented by the letters, "A", "B", "C", and "D," respectively.

Within the initial schedule table 600 (before timeslot 1), the "Pkts Left" field 602 is used to track the number of packets remaining in each branch, while the "Last Slot" field 604 shows the last timeslot during which a branch forwarded a packet to the base-station. Branch 402, with the maximum number of packets, forwards a packet in the first timeslot. At the end of each timeslot, every node in the network can update its copy of the common schedule table accordingly.

In the example of FIG. 4, eight timeslots are required to complete the convergecast operation. The contents of the common schedule table maintained at each node by the end of timeslots 1-8 are shown in schedule tables 602-630, respectively, which appear in FIG. 6. Pseudo-code for each node to implement the above-described convergecast scheduling operation is shown in Table 1.

Note that the lower bound on number of timeslots required for this convergecast scheduling in multi-line networks is given by $\max(3n_k-3, N)$, wherein N represents the number of nodes in the network and $n_k$ represents the maximum number nodes in a branch. Furthermore, note that the number of timeslots required by above-described convergecast-scheduling technique for multi-line networks is given by max(3n_k−1, N), wherein N represents the number of nodes in the network and $n_k$ represents the maximum number nodes in a branch.

Scheduling Convergecast in a General Network

In one embodiment of the present invention, a general network comprising a base-station and a plurality of nodes can be configured into a tree network for convergecast operation, wherein the base-station is the root node of the tree network. For example, FIG. 1 illustrates such a convergecast tree network comprising all the nodes 104 and the root node, base-station 102.

Figure 7A:
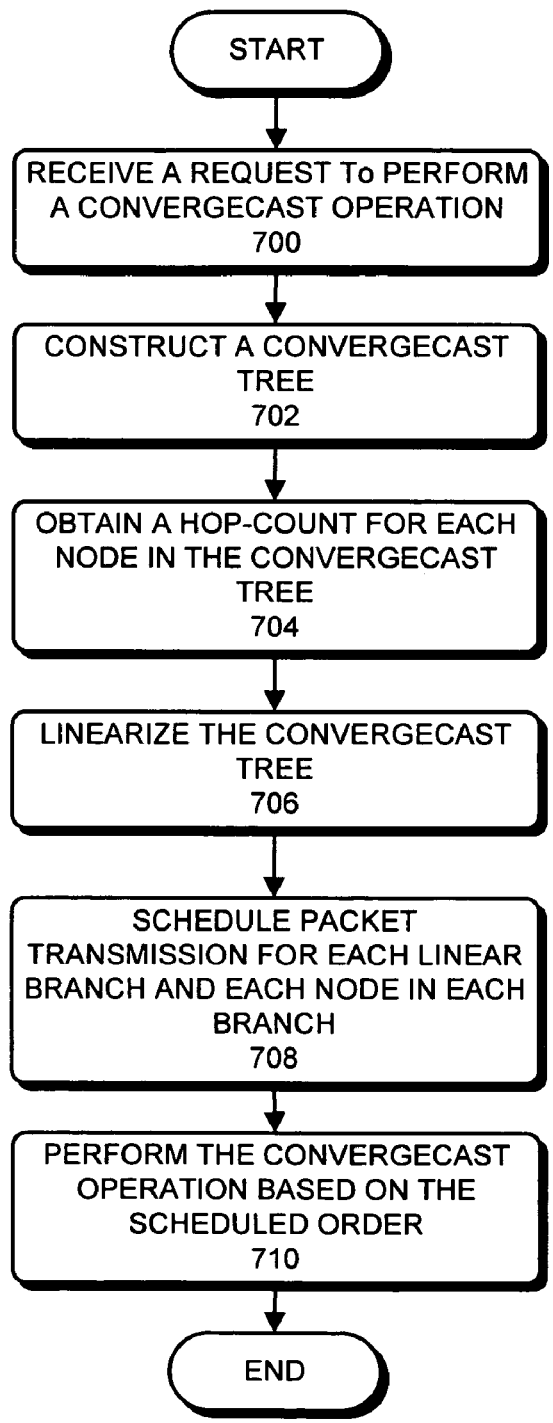
FIG. 7A presents a flowchart illustrating a process of performing a convergecast operation in a general network in accordance with an embodiment of the present invention.

FIG. 7A presents a flowchart illustrating a convergecast operation in a general network in accordance with an embodiment of the present invention. During operation, the system receives a request to perform a convergecast operation (step 700). Upon receiving this request, the system constructs a convergecast-tree, which includes the base-station and the plurality of nodes, based on hop-counts from the plurality of nodes to the base-station (step 702).

Figure 7B:
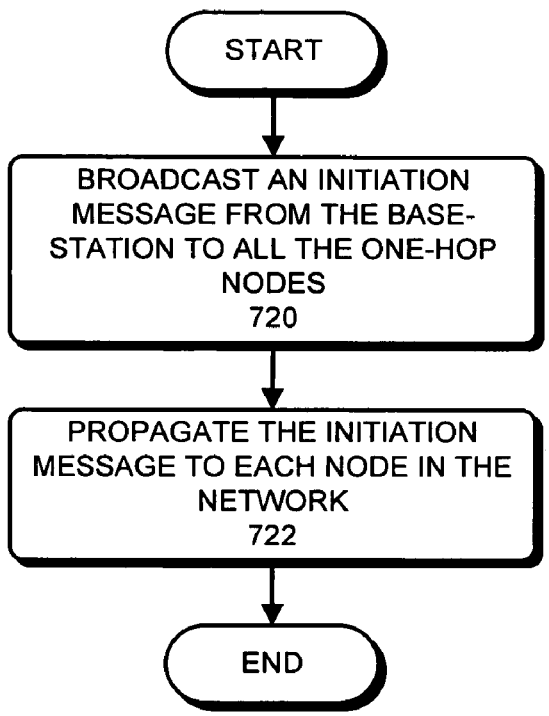
FIG. 7B presents a flowchart illustrating a process of constructing a convergecast-tree in a general network in accordance with an embodiment of the present invention.

FIG. 7B presents a flowchart illustrating a process of constructing a convergecast-tree in a network in accordance with an embodiment of the present invention. During operation, the system first broadcasts an initiation message from the base-station to all of its one-hop neighbors (step 720). Next, the system propagates the initiation message to each node in the plurality of the nodes through broadcast forwarding with duplicate suppression (step 722).

During the process of constructing a convergecast-tree, every node in the network actively listens to the wireless medium. The one-hop neighbors of the base-station can schedule their transmissions to the base station upon receiving the convergecast initiation message. Next, the two-hop neighbors of the base-station determine that the convergecast has began and start to schedule their transmissions by actively listening to the transmissions of the initiation message from the one-hop neighbors. Similarly, any node in the network can start scheduling a transmission operation upon receiving an initiation message propagated from its associated parent node.

Figure 8B:
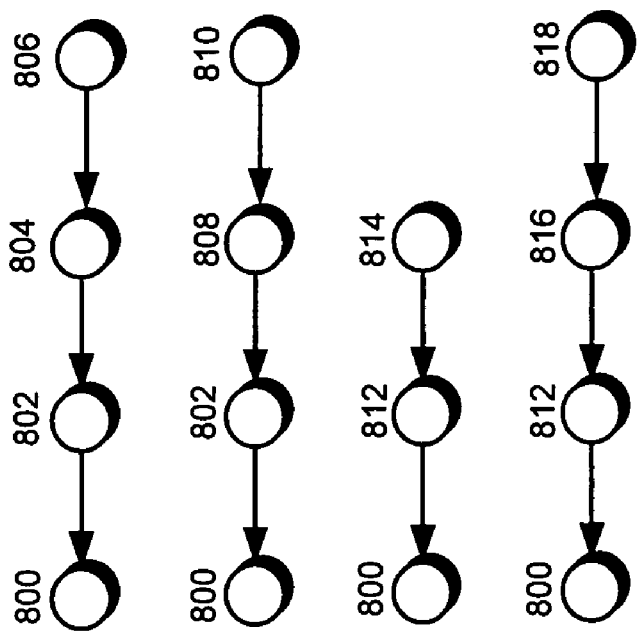
FIG. 8B illustrates decomposed linear networks of a general tree network in accordance with an embodiment of the present invention.
Figure 8A:
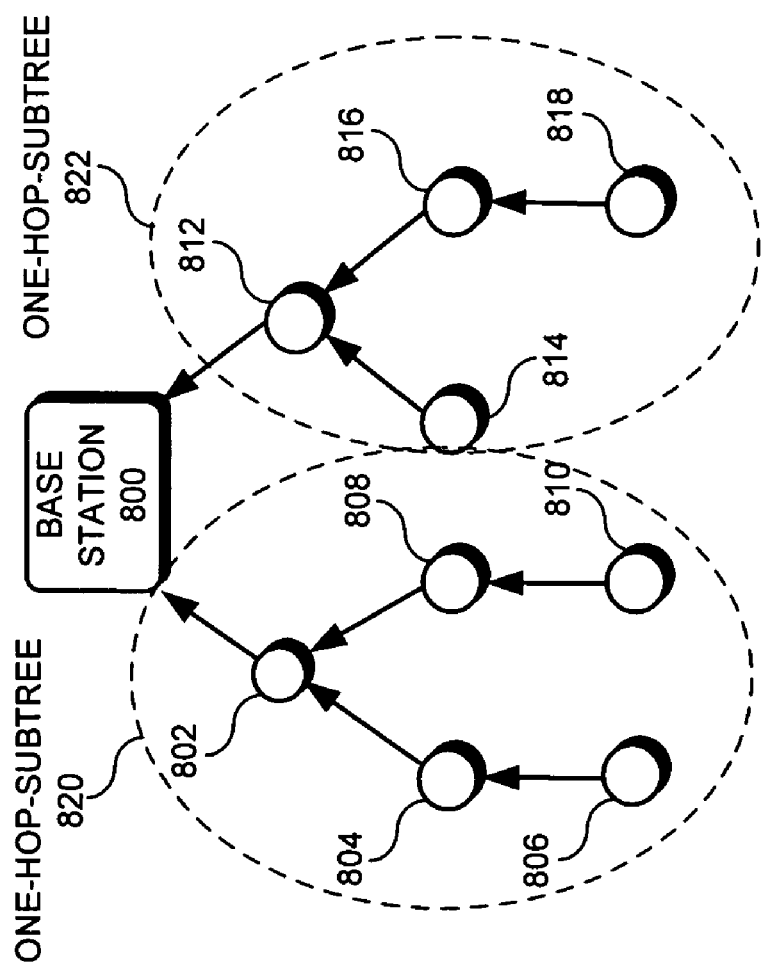
FIG. 8A illustrates a shortest-hop-tree constructed from a general network in accordance with an embodiment of the present invention.

In one embodiment of the present invention, the convergecast-tree is a shortest-hop-count tree, which is constructed so that the total number of hops from the base-station to all the nodes in the convergecast-tree is minimized. FIG. 8A illustrates a shortest-hop-tree constructed for a general network in accordance with an embodiment of the present invention.

Next, the system obtains a hop-count for each node in the convergecast tree (step 704).

The system then linearizes this convergecast-tree so that the convergecast-tree contains a plurality of linear branches (step 706). Specifically, the system linearizes the convergecast-tree by decomposing the convergecast-tree into a plurality of logically linear branches, wherein each of the linear branches is a linear network as previously described.

For example, the tree network shown in FIG. 8A can be represented as a combination of the following linear networks: (i) 800←802←804←806, (ii) 800←802←808←810, (iii) 800←812←814, and (iv) 800←812←816←818, wherein 800 is the base-station. FIG. 8B illustrates the decomposed linear networks fir the tree network illustrated in FIG. 8A in accordance with an embodiment of the present invention.

Note that, steps 700, 702, 704, and 706 collectively comprise the initialization phase of the of convergecast operation for the general network. At the end of the step 706, each node is aware of its initial state (T, I, or R), and can schedule its time to start transmission based on its knowledge about the entire network.

The system then schedules packet transmission for each of the plurality of linear branches and each node in each branch based on a set of predetermined criteria (step 708), wherein the set of predetermined criteria can include the number of nodes in a linear branch or the identifier of a linear branch.

In one embodiment of the present invention, the system schedules packet transmissions for the plurality of linear branches by iteratively selecting up to three linear branches from the plurality of linear branches and scheduling an order of packet transmission among the selected linear branches based on the set of predetermined criteria. Note that it is typically desirable to group together those linear branches that have an equal or a nearly-equal number of nodes. Specifically, the system can schedule convergecast operations for the selected linear branches in parallel similarly to the process described for multi-line networks.

For example, in the tree network in FIG. 8A, one can first select three linear branches (i) 800←802←804←806, (ii) 800←802←808←810, and (iv) 800←812←816←818, and can then schedule the transmission among these branches in parallel. For example, the system can interleave transmissions of the three linear branches. Upon completing all packet transmissions, the system next selects the remaining branch (iii) 800←812←814, and schedules transmissions for this remaining branch accordingly.

Note that, if a branch in a selected group of branches completes transmitting all of its the packets prior to completion of other branches, the system can select a branch from the remaining unselected branches and can add that branch to the group of branches.

In one embodiment of the present invention, the system schedules packet transmissions for the convergecast-tree based on subtree structures. We use the term "one-hop-subtree" to refer to any subtree in the convergecast-tree that is rooted at an one-hop neighbor of the base station. For example, FIG. 8A is comprised of two one-hop-subtrees, 820 and 822, rooted at nodes, 802 and 812, respectively.

Note that all of the one-hop-subtrees can be scheduled in parallel as if in a multi-line network, i.e. each one-hop-subtree will correspond to a branch in the multi-line network. In one embodiment of the present invention, an one-hop-subtree with the highest number of packets left is scheduled to transmit during each timeslot.

Furthermore, within each one-hop-subtree, a node should know how many packets from the associated one-hop-subtree have been transmitted to the base-station before the node can become "active," i.e., the node starts changing states according to the transition diagram. In one embodiment of the present invention, a node can generate this knowledge by performing an in-order traversal of the convergecast-tree back to the base-station through "distributed scheduling."

Finally, during a convergecast in a tree network, the system performs packet transmissions in the convergecast-tree using the scheduled order (step 710).

TABLE 1

Notation:
    Q: transmission queue;
    I ∈ {1, ..., k}: branch ID of this node;
    S ∈ {T, I, R}: current state;
    N : [$n_1, n_2, ..., n_k$]: number of packets in each branch;
    t: current timeslot;
    T : [$t_1, t_2, ..., t_k$]: last active timeslot TABLE 1-continued

```
initialization:
    S set according to hop-count;
    N set with initial numbers given by the base station;
    t = 1;
    t_i = 0 ∀i ∈ {1, 2, ..., k};
0. at timeslot t:
1. Let L = {i|t_i < t}; set of eligible branches to transmit at t;
2. Let j = arg max{n_i|i ∈ L} be the first branch in L
    that has the maximum number of nodes left;
3. n_j ← max(n_j − 1, 0); branch j will transmit at timeslot t
4. t_j ← t_j + 2; branch j will not be eligible for next two time slots
5. if t ≦ t_j; this branch is active
6.          switch S
7.                  case T: transmit one packet from Q
8.                  case I: idle
9.                  case R: push the received packet into Q
10.         end switch
11.                 S ← next(S); according to Figure 2
12. end if
13. t ← t + 1;
14. if max(N) = 0 and t > max(T)
15.         initialization
16. end if
```

The pseudo-code for scheduling within the tree networks is the same as for multi-line networks, except that the active condition for a node (line 5 in Table 1) has to be modified to: $t<t_I$ and $\Delta n_I \geq W_v$, wherein $\Delta n_I = n_I^0 - n_I$ is the number of packets transmitted by one-hop-subtree I to the base-station before timeslot t, v is any node in the tree, and $W_v$ is the number of packets that have to be transmitted by the corresponding subtree before node v becomes active.

Note that the number of timeslots required by the present convergecast scheduling technique for tree networks is at most $\max(3n_k-1; N)$, wherein $n_k$ represents the number of nodes in the largest one-hop-subtree, and N is the number of nodes in the convergecast-tree. For example, the network shown in FIG. 8A can be viewed as a two-line network which requires 14 ($n_k$=5) timeslots to complete a convergecast operation.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing packet transmission during a convergecast operation in a convergecast network, the method comprising:
   receiving a request to perform the convergecast operation in the convergecast network, wherein the convergecast network comprises a base-station and a plurality of nodes, and wherein during the convergecast operation the plurality of nodes communicate packets to the base-station;
   constructing a convergecast-tree, which includes the base-station and the plurality of nodes, based on hop counts from the plurality of nodes to the base-station;
   linearizing the convergecast-tree so that the convergecast-tree contains a plurality of linear branches;
   scheduling packet transmissions for each of the plurality of linear branches and each node in each branch based on a set of predetermined criteria to obtain a scheduled order, wherein obtaining the convergecast schedule for each node involves performing a traversal of the convergecast-tree from each node in the plurality of the nodes to the base-station; and
   performing packet transmissions in the convergecast-tree using the scheduled order;
   wherein performing the convergecast operation using the scheduled order substantially optimizes the convergecast operation by reducing a total number of timeslots required to complete the convergecast operation.

2. The method of claim 1, wherein constructing the convergecast-tree involves:
   broadcasting a message from the base-station to all one-hop neighbors of the base-station;
   propagating the message to each node in the plurality of the nodes through broadcast forwarding with duplicate suppression; and
   constructing a shortest-hop-count tree to form the convergecast-tree.

3. The method of claim 1, further comprising obtaining a hop-count for each node in the plurality of the nodes prior to scheduling the packet transmissions.

4. The method of claim 1, wherein each node in the plurality of nodes can be in one of the following states during each timeslot of the convergecast operation:
   a receiving state, during which the node may receive a packet from a neighboring node;
   a transmitting state, during which the node may transmit a packet to a neighboring node; and
   an idle state, during which the node neither transmits nor receives.

5. The method of claim 1, wherein linearizing the convergecast-tree involves decomposing the convergecast-tree into a plurality of logically linear branches.

6. The method of claim 1, wherein the scheduling of packet transmissions for the plurality of linear branches involves iteratively:
   selecting up to three linear branches from the plurality of linear branches; and
   scheduling an order of packet transmission among the selected linear branches based on the set of predetermined criteria.

7. The method of claim 1, wherein the set of predetermined criteria can include:
   a number of nodes in a linear branch; and
   an identifier for the linear branch.

8. The method of claim 1, wherein each node in the plurality of nodes computes its own scheduled order during the convergecast operation.

9. The method of claim 1, wherein the convergecast-tree can be decomposed into a set of one-hop-subtrees, wherein the root of each of the set of one-hop-subtrees is an one-hop neighbor of the base-station.

10. The method of claim 1, wherein the total number of timeslots required to complete the convergecast operation based on the scheduled order is at most max ($3n_k-1$, N), wherein:
    $n_k$ is the number of nodes in the largest linear branch; and
    N is the number of nodes in the convergecast-tree.

11. The method of claim 1, wherein the convergecast network is a wireless network.

12. A computer-readable storage medium storing instructions that when executed by a computer cause the computer to perform a method for optimizing packet transmission during a convergecast operation in a convergecast network, the method comprising:
   receiving a request to perform the convergecast operation in the convergecast network, wherein the convergecast network comprises a base-station and a plurality of nodes, and wherein during the convergecast operation the plurality of nodes communicate packets to the base-station;

constructing a convergecast-tree, which includes the base-station and the plurality of nodes, based on hop counts from the plurality of nodes to the base-station;

linearizing the convergecast-tree so that the convergecast-tree contains a plurality of linear branches;

scheduling packet transmissions for each of the plurality of linear branches and each node in each branch based on a set of predetermined criteria to obtain a scheduled order, wherein obtaining the convergecast schedule for each node involves performing a traversal of the convergecast-tree from each node in the plurality of the nodes to the base-station; and performing packet transmissions in the convergecast-tree using the scheduled order;

wherein performing the convergecast operation using the scheduled order substantially optimizes the convergecast operation by reducing a total number of timeslots required to complete the convergecast operation.

13. The computer-readable storage medium of claim 12, wherein constructing the convergecast-tree involves:

broadcasting a message from the base-station to all one-hop neighbors of the base-station;

propagating the message to each node in the plurality of the nodes through broadcast forwarding with duplicate suppression; and constructing a shortest-hop-count tree to form the convergecast-tree.

14. The computer-readable storage medium of claim 12, further comprising obtaining a hop-count for each node in the plurality of the nodes prior the scheduling the packet transmissions.

15. The computer-readable storage medium of claim 12, wherein each node in the plurality of nodes can be in one of the following states during each timeslot of the convergecast operation:

a receiving state, during which the node may receive a packet from a neighboring node;

a transmitting state, during which the node may transmit a packet to a neighboring node; and an idle state, during which the node neither transmits nor receives.

16. The computer-readable storage medium of claim 12, wherein linearizing the convergecast-tree involves decomposing the convergecast-tree into a plurality of logically linear branches.

17. The computer-readable storage medium of claim 12, wherein the scheduling of packet transmissions for the plurality of linear branches involves iteratively:

selecting up to three linear branches from the plurality of linear branches; and scheduling an order of packet transmission among the selected linear branches based on the set of predetermined criteria.

18. The computer-readable storage medium of claim 12, wherein the set of predetermined criteria can be include:

a number of nodes in a linear branch; and an identifier for the linear branch.

19. The computer-readable storage medium of claim 12, wherein each node in the plurality of nodes computes its own scheduled order during the convergecast operation.

20. The computer-readable storage medium of claim 12, wherein the convergecast-tree can be decomposed into a set of one-hop-subtrees, wherein the root of each of the set of one-hop-subtrees is an one-hop neighbor to the base-station.

21. The computer-readable storage medium of claim 12, wherein the total number of timeslots required to complete the convergecast operation based on the scheduled order is at most max($3n_k-1$, N), wherein:

$n_k$ is the number of nodes in the largest linear branch; and

N is the number of nodes in the convergecast-tree.

22. The computer-readable storage medium of claim 12, wherein the convergecast network is a wireless network.

23. An apparatus that optimizes packet transmission during a convergecast operation in a convergecast network, comprising:

a receiving mechanism configured to receive a request to perform the convergecast operation in the convergecast network, wherein the convergecast network comprises a base-station and a plurality of nodes, and wherein during the convergecast operation the plurality of nodes communicate packets to the base-station;

a construction mechanism configured to construct a convergecast-tree, which includes the base-station and the plurality of nodes, based on hop counts from the plurality of nodes to the base-station;

a linearization mechanism configured to linearize the convergecast-tree so that the convergecast-tree contains a plurality of linear branches;

a scheduling mechanism configured to schedule packet transmission for each of the plurality of linear branches and each node in each branch based on a set of predetermined criteria to obtain a scheduled order, wherein obtaining the convergecast schedule for each node involves performing a traversal of the convergecast-tree from each node in the plurality of the nodes to the base-station; and a transmitting mechanism configured to perform packet transmissions in the convergecast-tree using the scheduled order;

wherein performing the convergecast operation using the scheduled order substantially optimizes the convergecast operation by reducing a total number of timeslots required to complete the convergecast operation.

24. The apparatus of claim 23, wherein the construction mechanism includes:

a broadcasting mechanism configured to broadcast a message from the base-station to all one-hop neighbors of the base-station; a a propagation mechanism configured to propagate the message to each node in the plurality of the nodes through broadcast forwarding with duplicate suppression; and a tree-construction mechanism configured to construct a shortest-hop-count tree to form the convergecast-tree.

* * * * *